(12) United States Patent
Raymond et al.

(10) Patent No.: US 12,159,250 B2
(45) Date of Patent: Dec. 3, 2024

(54) SYSTEM AND METHOD FOR AUTOMATICALLY COMPUTING RECOVERY METRICS AND SUGGESTING RECOVERY PLANS VIA REAL-TIME TELEMETRY

(71) Applicant: JPMorgan Chase Bank, N.A., New York, NY (US)

(72) Inventors: Erol Raymond, New Providence, NJ (US); Melvin Lopez, Brooklyn, NY (US); Pavankumar Kalal, Jersey City, NJ (US); Radhakrishnan Ramasamy, Bridgewater, NJ (US); Ed Srags, Manalapan, NJ (US); Karen Joy Anyayahan-McKnight, Rising Sun, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 149 days.

(21) Appl. No.: 17/661,208

(22) Filed: Apr. 28, 2022

(65) Prior Publication Data
US 2022/0374796 A1    Nov. 24, 2022

Related U.S. Application Data

(60) Provisional application No. 63/189,881, filed on May 18, 2021.

(51) Int. Cl.
*G06Q 10/0635*    (2023.01)
*G06N 7/01*    (2023.01)

(52) U.S. Cl.
CPC ........... *G06Q 10/0635* (2013.01); *G06N 7/01* (2023.01)

(58) Field of Classification Search
CPC ............................ G06Q 10/0635; G06N 7/01
See application file for complete search history.

(56) References Cited

U.S. PATENT DOCUMENTS

| | | | | |
|---|---|---|---|---|
| 7,096,381 | B2 * | 8/2006 | Largman | G06F 11/1456 714/13 |
| 10,796,035 | B1 * | 10/2020 | Xia | G06F 30/18 |
| 11,038,784 | B2 * | 6/2021 | Nickolov | H04L 63/1433 |
| 11,409,587 | B2 * | 8/2022 | Bridges | G06F 11/3604 |
| 11,610,136 | B2 * | 3/2023 | Jasionowski | G06F 16/2465 |

(Continued)

OTHER PUBLICATIONS

Official communication received in PCT Application No. PCT/US 2022/26771 dated Aug. 26, 2022.

*Primary Examiner* — Dylan C White
(74) *Attorney, Agent, or Firm* — GREENBLUM & BERNSTEIN, P.L.C.

(57) ABSTRACT

Various methods, apparatuses/systems, and media for understanding the recovery of business services due to loss of availability that occur in information technology infrastructure are provided. The system and method automatically predict or detect the probability of an availability incident, determine associated risk and impact using a machine learning model to enhance the determination of severity of an incident based upon technology component attributes data, incident history data or other metadata. The machine learning model also alerts and determines capacity requirements/availability of alternate infrastructure impacted to begin orchestrating recovery and the overall recovery time and potential data loss.

20 Claims, 6 Drawing Sheets

(56) References Cited

U.S. PATENT DOCUMENTS

| | | | | |
|---|---|---|---|---|
| 2005/0027571 A1* | 2/2005 | Gamarnik | ............... | G06Q 40/08 |
| | | | | 705/4 |
| 2009/0300409 A1* | 12/2009 | Bates | .................... | G06F 11/008 |
| | | | | 714/E11.144 |
| 2010/0250448 A1* | 9/2010 | Towe | ................... | G06Q 10/067 |
| | | | | 705/305 |
| 2017/0308421 A1* | 10/2017 | Angeles | .............. | G06F 11/0709 |
| 2018/0074887 A1* | 3/2018 | Braham | .............. | G06F 11/0709 |
| 2019/0102411 A1* | 4/2019 | Hung | ..................... | G06N 5/025 |
| 2019/0121706 A1* | 4/2019 | MacDonald McAlister | ................ | |
| | | | | G06F 11/1464 |
| 2020/0159609 A1* | 5/2020 | Korotaev | ............. | G06F 11/0709 |
| 2020/0278901 A1* | 9/2020 | Singh | ....................... | G06N 5/02 |
| 2020/0348662 A1* | 11/2020 | Cella | ................ | G05B 19/41865 |
| 2020/0372372 A1* | 11/2020 | Jasionowski | ............ | G06N 7/01 |
| 2022/0329616 A1* | 10/2022 | O'Hearn | ................. | G06F 9/545 |
| 2023/0362200 A1* | 11/2023 | Crabtree | ............... | G06F 16/951 |

\* cited by examiner

SYSTEM AND METHOD FOR AUTOMATICALLY COMPUTING RECOVERY METRICS AND SUGGESTING RECOVERY PLANS VIA REAL-TIME TELEMETRY

CROSS-REFERENCE TO RELATED APPLICATIONS

This application claims the benefit of priority from U.S. Provisional Patent Application No. 63/189,881, filed May 18, 2021, which is herein incorporated by reference in its entirety.

TECHNICAL FIELD

This disclosure generally relates to information technology (IT), and, more particularly, to methods and apparatuses for implementing a smart simulation recovery module that automatically provides an estimate on overall recovery time of an application or an infrastructure or a business process as well as the amount of data loss that could occur in the event of a destructive malware attack or system maintenance lags or unplanned system outages that would cause the need to rebuild and restore the application or a suite of applications supporting a business process.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today's IT environments have grown exponentially as the threat and regulatory landscape has expanded. Systemically important institutions may be required to be aware of the impact in time and cost to recover critical business services and process, which include IT. Business processes and services are typically composed of technology, people and processes which are intertwined between different business units, support teams and management. To ensure systemically important institutions are prepared to predict the recovery time to a trusted state of a business service or process or other organizationally important unit-of-measure and to compare with the Recovery Time Objective(RTO) and or industry standard measurement of recovery. It is vital to ensure technology recovery issues can be remediated in advance before the Recovery Time crosses the RTO and become an incident.

Business organizations within systemically important institutions may view the recovery of technology via different attributes, such as, business product recovery, technology product recovery, business process recovery and technology component recovery, etc. Using telemetry data and metadata provided by organizational systems-of-record, it may be possible to predict potential recovery times for: Return to Operation, Recovery Point Objective, MTBF (mean time before failure), MTTR (mean time to recovery, repair, respond, or resolve), MTTA (mean time to acknowledge), and MTTF (mean time to failure) to analyze, develop new recovery capabilities and act upon to make systemically important institutions more resilient. It is therefore appreciated that a need exists for systems and methods for predicting the recovery of technology in time based upon business requirements to determine potential risks and impact to increase the resiliency of the business and suggest or initiate an automated recovery strategy.

SUMMARY

The present disclosure, through one or more of its various aspects, embodiments, and/or specific features or sub-components, provides, among other features, various systems, servers, devices, methods, media, programs, and platforms for implementing a smart simulation recovery module that automatically provides an estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto. According to exemplary embodiments, the amount of data loss may be a metric that needs computation and an exemplary objective of the instant disclosure is to ascertain the impact on applications, infrastructure and services.

For example, the present disclosure, through one or more of its various aspects, embodiments, and/or specific features or sub-components, also provides, among other features, various systems, servers, devices, methods, media, programs, and platforms for implementing a smart simulation recovery module that implements an active machine learning module configured to: receive and maintain current and historic application data; asset data, data recovery data, business process data, technology product data, application transaction data, incident and change management data and threat intelligence data to calculate recovery capabilities/metrics for critical business processes and services, but the disclosure is not limited thereto. The active machine learning module may be configured to monitor critical business processes and services to identify potential operational risk, where expected recovery times are incongruent with actual recovery times by regulation, business objectives, technology design or sub-optimal operational processes, but the disclosure is not limited thereto. When a potential availability incident is detected, the active machine learning module may be further configured to identify the business process or service and calculate the potential operational risk to a firm as a whole or an organizational unit and activate an orchestration engine to position for recovery, but the disclosure is not limited thereto.

The present disclosure, through one or more of its various aspects, embodiments, and/or specific features or sub-components, also provides, among other features, various systems, servers, devices, methods, media, programs, and platforms for implementing a smart simulation recovery module that may be configured to provide the ability to automatically adjust based on key telemetry data such as backup information including last known good (trusted state) as well as the changes to technology capability and the time of day of event. In addition, the smart simulation recovery module may be further configured to automatically schedule a recovery test to validate the simulations result based on key criteria. Likewise, the smart simulation recovery module may be further configured to allow a user to choose different times of day when the destructive event occurs as well as to allow to adjust the applications recovery capability based on future solutions being implemented. Thus, the smart simulation recovery module may provide a platform that provides both the applications and/or business operations teams to see potential impacts to applications moving to new technologies.

According to an aspect of the present disclosure, a method for automatic predictive analysis of a recovery time of an application or an infrastructure or a business process via real-time telemetry to a trusted state, by utilizing one or more processors and one or more memories, is disclosed. The method may include: establishing a communication link between a plurality of data sources and an event bus; implementing a machine learning model configured to receive a plurality of real-time telemetry data and historical event data associated with an application or a suite of applications supporting an infrastructure or a business process from the plurality of data sources via the event bus; automatically predicting, by utilizing the machine learning model, a probability data of an availability incident based on the received plurality of real-time telemetry data and the historical event data; determining, based on the probability data, associated risk and impact of an amount of data loss that could occur in an event of a destructive attack that would cause a need to rebuild and/or restore the application or the suite of applications supporting the infrastructure or the business process; and dynamically providing an estimate data on overall recovery time and/or rebuild time of the application or the suite of applications based on determining the associated risk and impact of the amount of data loss.

According to another aspect of the present disclosure, the plurality of real-time telemetry data may include application data, asset data, data recovery data, business process data, technology product data, application transaction data and threat intelligence data to calculate recovery capabilities and/or metrics for critical infrastructure or business processes and services, but the disclosure is not limited thereto.

According to a further aspect of the present disclosure, the method may further include: monitoring the critical infrastructure or the business processes and services to identify potential operational risk, wherein expected recovery times are incongruent with actual recovery times by regulation, business objectives, technology design, or sub-optimal operational processes.

According to yet another aspect of the present disclosure, the method may further include: automatically detecting, by utilizing the machine learning model, the availability incident based on the received plurality of real-time telemetry data and the historical event data; and performing automated repair and/or change functions based on the estimate data in response to the event of the destructive attack.

According to a further aspect of the present disclosure, the method may further include: activating a full autonomous recovery process of impacted environment in response to the event of the destructive attack.

According to another aspect of the present disclosure, the event bus may be configured to provide one or more communication channels between technology asset data source, application transaction data source, and threat intelligence data source to analyze and execute recovery activities in real-time, but the disclosure is not limited thereto.

According to yet another aspect of the present disclosure, in receiving the plurality of real-time telemetry data, the method may further include: dynamically tracking information assets data within an organization; dynamically tracking the application or the suite of applications within the organization; and dynamically tracking resiliency and recovery attributes data of technology products that are used in the organization.

According to a further aspect of the present disclosure, in determining the associated risk and the impact of the amount of data loss, the method may further include: recording pending infrastructure or business-related changes and impacted assets and timeframes for implementation and human-generated risk and impact assessments.

According to another aspect of the present disclosure, the machine learning model may be configured to alert and determine capacity requirements and/or availability of alternate infrastructure impacted to begin orchestrating recovery and the overall recovery time and the amount of data loss, but the disclosure is not limited thereto.

According to yet another aspect of the present disclosure, the method may further include: automatically providing simulations result for recovery; and automatically scheduling a recovery test to validate the simulations result.

According to a further aspect of the present disclosure, when a potential availability incident is detected, the machine learning model may be further configured to identify a business process or a service and calculate a potential operational risk to an organization as a whole or an organizational unit and activate an orchestration engine to execute recovery.

According to another aspect of the present disclosure, the method may further include: providing a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

According to yet another aspect of the present disclosure, the method may further include: executing one or more of the following processes: a recovery process to rebuild the application or the suite of applications; a recovery process to last known trusted state of the application or the suite of applications, and a simulation/testing of a recovery process.

According to an aspect of the present disclosure, a system for automatic predictive analysis of a recovery time of an application or an infrastructure or a business process via real-time telemetry to a trusted state is disclosed. The system may include: a processor; and a memory operatively connected to the processor via a communication interface, the memory storing computer readable instructions, when executed, may cause the processor to: establish a communication link between a plurality of data sources and an event bus; implement a machine learning model configured to receive a plurality of real-time telemetry data and historical event data associated with an application or a suite of applications supporting an infrastructure or a business process from the plurality of data sources via the event bus; automatically predict, by utilizing the machine learning model, a probability data of an availability incident based on the received plurality of real-time telemetry data and the historical event data; determine, based on the probability data, associated risk and impact of an amount of data loss that could occur in an event of a destructive attack that would cause a need to rebuild and/or restore the application or the suite of applications supporting the infrastructure or the business process; and dynamically provide an estimate data on overall recovery time and/or rebuild time of the application or the suite of applications based on determining the associated risk and impact of the amount of data loss.

According to a further aspect of the present disclosure, the processor is further configured to: monitor the critical infrastructure or the business processes and services to identify potential operational risk, wherein expected recovery times are incongruent with actual recovery times by regulation, business objectives, technology design, or sub-optimal operational processes.

According to yet another aspect of the present disclosure, the processor is further configured to: automatically detect, by utilizing the machine learning model, the availability incident based on the received plurality of real-time telemetry data and the historical event data; and performing automated repair and/or change functions based on the estimate data in response to the event of the destructive attack.

According to a further aspect of the present disclosure, the processor is further configured to: activate a full autonomous recovery process of impacted environment in response to the event of a destructive attack.

According to yet another aspect of the present disclosure, in receiving the plurality of real-time telemetry data, the processor is further configured to: dynamically track information assets data within an organization; dynamically track the application or the suite of applications within the organization; and dynamically track resiliency and recovery attributes data of technology products that are used in the organization.

According to a further aspect of the present disclosure, in determining the associated risk and the impact of the amount of data loss, the processor is further configured to: record pending infrastructure or business-related changes and impacted assets and timeframes for implementation and human-generated risk and impact assessments.

According to yet another aspect of the present disclosure, the processor is further configured to: automatically provide simulations result for recovery; and automatically schedule a recovery test to validate the simulations result.

According to another aspect of the present disclosure, the processor is further configured to: provide a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

According to yet another aspect of the present disclosure, the processor is further configured to: execute one or more of the following processes: a recovery process to rebuild the application or the suite of applications; a recovery process to last known trusted state of the application or the suite of applications, and a simulation/testing of a recovery process.

According to an aspect of the present disclosure, a non-transitory computer readable medium configured to store instructions for automatic predictive analysis of a recovery time of an application or an infrastructure or a business process via real-time telemetry to a trusted state is disclosed. The instructions, when executed, may cause the processor to perform the following: establishing a communication link between a plurality of data sources and an event bus; implementing a machine learning model configured to receive a plurality of real-time telemetry data and historical event data associated with an application or a suite of applications supporting an infrastructure or a business process from the plurality of data sources via the event bus; automatically predicting, by utilizing the machine learning model, a probability data of an availability incident based on the received plurality of real-time telemetry data and the historical event data; determining, based on the probability data, associated risk and impact of an amount of data loss that could occur in an event of a destructive attack that would cause a need to rebuild and/or restore the application or the suite of applications supporting the infrastructure or the business process; and dynamically providing an estimate data on overall recovery time and/or rebuild time of the application or the suite of applications based on determining the associated risk and impact of the amount of data loss.

According to a further aspect of the present disclosure, the instructions, when executed, may cause the processor to further perform the following: monitoring the critical infrastructure or the business processes and services to identify potential operational risk, wherein expected recovery times are incongruent with actual recovery times by regulation, business objectives, technology design, or sub-optimal operational processes.

According to yet another aspect of the present disclosure, the instructions, when executed, may cause the processor to further perform the following: automatically detecting, by utilizing the machine learning model, the availability incident based on the received plurality of real-time telemetry data and the historical event data; and performing automated repair and/or change functions based on the estimate data in response to the event of the destructive attack.

According to a further aspect of the present disclosure, the instructions, when executed, may cause the processor to further perform the following: activating a full autonomous recovery process of impacted environment in response to the event of the destructive attack.

According to yet another aspect of the present disclosure, in receiving the plurality of real-time telemetry data, the instructions, when executed, may cause the processor to further perform the following: dynamically tracking information assets data within an organization; dynamically tracking the application or the suite of applications within the organization; and dynamically tracking resiliency and recovery attributes data of technology products that are used in the organization.

According to a further aspect of the present disclosure, in determining the associated risk and the impact of the amount of data loss, the instructions, when executed, may cause the processor to further perform the following: recording pending infrastructure or business-related changes and impacted assets and timeframes for implementation and human-generated risk and impact assessments.

According to yet another aspect of the present disclosure, the instructions, when executed, may cause the processor to further perform the following: automatically providing simulations result for recovery; and automatically scheduling a recovery test to validate the simulations result.

According to another aspect of the present disclosure, the instructions, when executed, may cause the processor to further perform the following: providing a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

According to yet another aspect of the present disclosure, the instructions, when executed, may cause the processor to further perform the following: executing one or more of the following processes: a recovery process to rebuild the application or the suite of applications; a recovery process to last known trusted state of the application or the suite of applications, and a simulation/testing of a recovery process.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
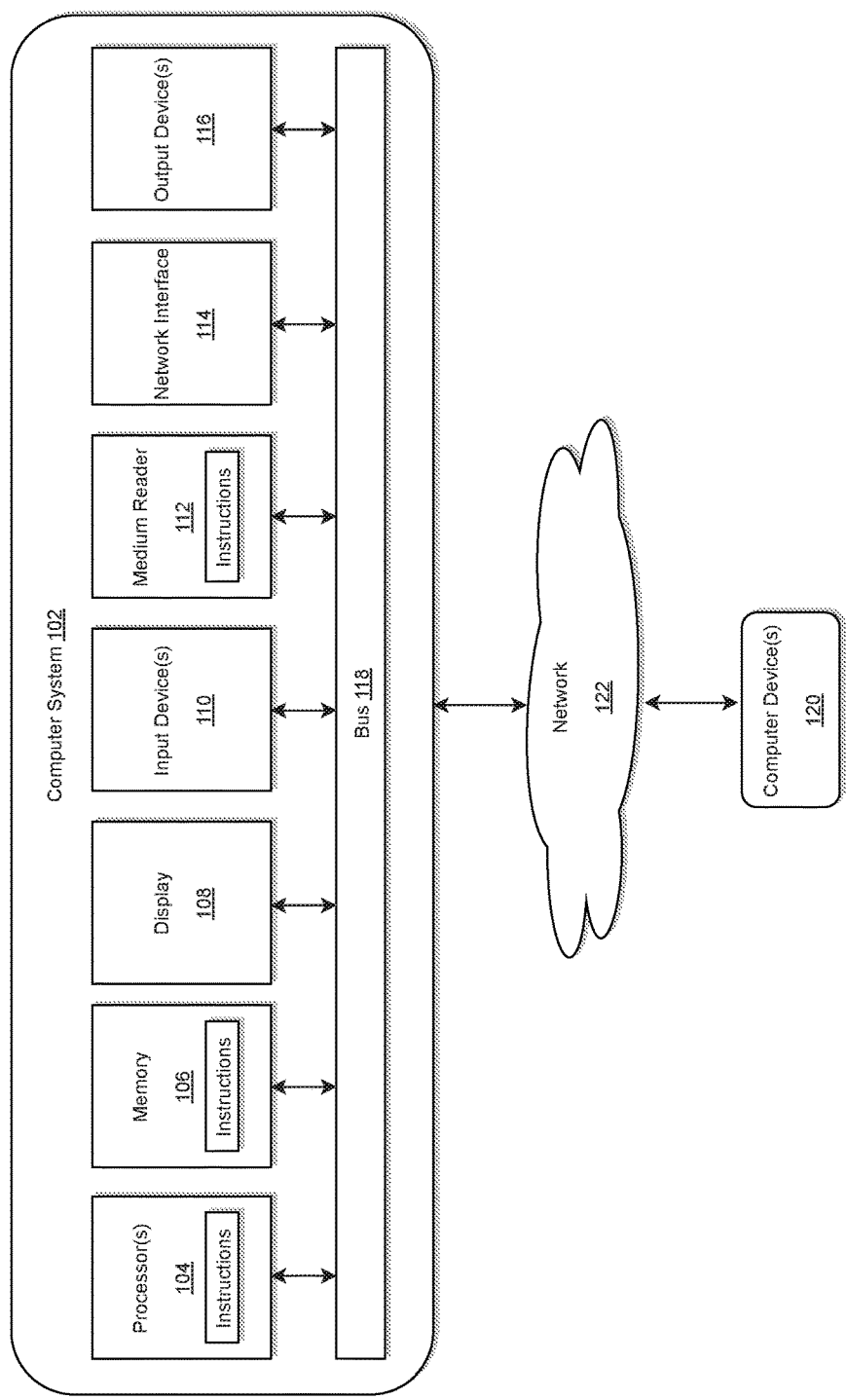
FIG. 1 illustrates the different components of a computer system for implementing a smart simulation recovery module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system of hardware and software components with embedded firmware for use in implementing a smart simulation recovery module that automatically provide predictive analysis of information technology (IT) process recovery via real-time telemetry to a trusted state in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecured and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, WiFi network, short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing a smart simulation recovery module that automatically provides an estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto.

Figure 2:
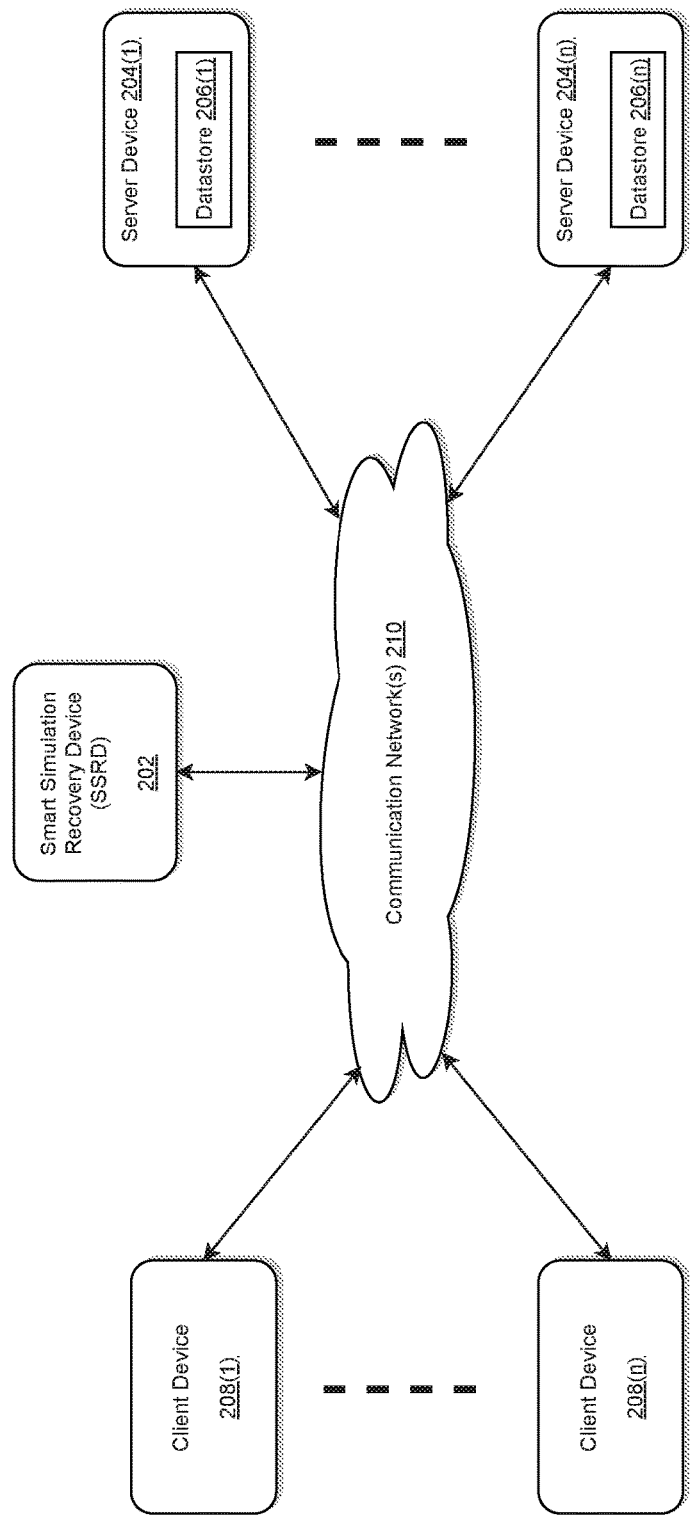
FIG. 2 illustrates an exemplary diagram of a network environment with a smart simulation recovery device in accordance with an exemplary embodiment.

Referring to FIG. 2, a schematic of an exemplary network environment 200 for implementing a smart simulation recovery device (SSRD) of the instant disclosure is illustrated.

According to exemplary embodiments, the above-described problems associated with conventional methods and systems may be overcome by implementing a SSRD 202 as illustrated in FIG. 2 by implementing a smart simulation recovery module that automatically provides estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto. For example, the above-described problems associated with conventional methods and systems may be overcome by implementing a SSRD 202 as illustrated in FIG. 2 by implementing a smart simulation recovery module that implements an active machine learning module configured to: receive application data; asset data, data recovery data, business process data, technology product data, application transaction data, and threat intelligence to calculate recovery capabilities/metrics for critical business processes and services, but the disclosure is not limited thereto.

The SSRD 202 may be the same or similar to the computer system 102 as described with respect to FIG. 1.

The SSRD 202 may store one or more applications that can include executable instructions that, when executed by the SSRD 202, cause the SSRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSRD 202 itself, may be located in virtual server(s) running in a cloud-based computing environment rather than being tied to one or more specific physical network computing devices. Also, the application(s) may be running in one or more virtual machines (VMs) executing on the SSRD 202. Additionally, in one or more embodiments of this technology, virtual machine(s) running on the SSRD 202 may be managed or supervised by a hypervisor.

In the network environment 200 of FIG. 2, the SSRD 202 is coupled to a plurality of server devices 204(1)-204(n) that hosts a plurality of datastores 206(1)-206(n), and also to a plurality of client devices 208(1)-208(n) via communication network(s) 210. A communication interface of the SSRD 202, such as the network interface 114 of the computer system 102 of FIG. 1, operatively couples and communicates between the SSRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The SSRD 202 may be a standalone device or integrated with one or more other devices or apparatuses, such as one or more of the server devices 204(1)-204(n), for example. In one particular example, the SSRD 202 may be hosted by one of the server devices 204(1)-204(n), and other arrangements are also possible. Moreover, one or more of the devices of the SSRD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSRD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the datastores 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the SSRD 202 that may be configured for implementing a smart simulation recovery module that automatically provides an estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the SSRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the SSRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSRD 202, the server devices 204(1)-204(n), or the client devices 208(1)-208(n), for example, may be configured to operate as virtual instances on the same physical machine. For example, one or more of the SSRD 202, the server devices 204(1)-204(n), or the client devices 208(1)-208(n) may operate on the same physical device rather than as separate devices communicating through communication network(s) 210. Additionally, there may be more or fewer SSRDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
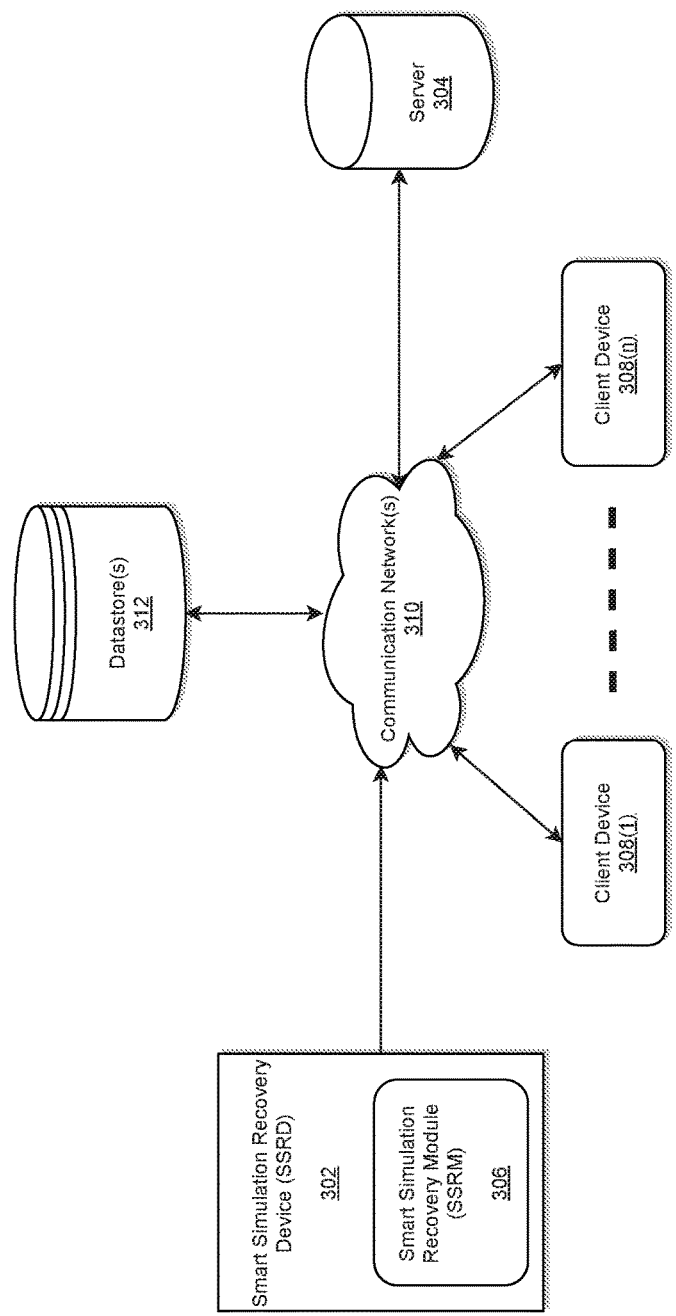
FIG. 3 illustrates a system diagram displaying the architecture for implementing a smart simulation recovery device with a smart simulation recovery module in accordance with an exemplary embodiment.

FIG. 3 illustrates a system diagram 300 for implementing a SSRD with a smart simulation recovery module (SSRM) in accordance with an exemplary embodiment.

As illustrated in FIG. 3, the SSRD 302 including the SSRM 306 may be connected to a server 304, and a datastore(s) 312 (i.e., a plurality of data sources) via a communication network 310. The SSRD 302 may also be connected to a plurality of client devices 308(1)-308(n) via the communication network 310, but the disclosure is not limited thereto. According to exemplary embodiments, the SSRM 306 may be implemented within the client devices 308(1)-308(n), but the disclosure is not limited thereto. According to exemplary embodiments, the client devices 308(1)-308(n) may be utilized for implementing the SSRM 306 that automatically provides an estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto.

According to exemplary embodiment, the SSRD 302 is described and shown in FIG. 3 as including the SSRM 306, although it may include other rules, policies, modules, datastores, or applications, for example. According to exemplary embodiments, the datastore 312 may be embedded within the SSRD 302. Although only one datastore 312 is illustrated in FIG. 3, according to exemplary embodiments, a plurality of datastores 312 may be provided. The datastore(s) 312 may include one or more data storage devices configured to store information data corresponding to application data; asset data, data recovery data, business process data, technology product data, application transaction data, and threat intelligence, historical event data, etc., but the disclosure is not limited thereto. For example, the datastore(s) 312 may include one or more memories configured to store information including: rules, programs, production requirements, testing requirements, control requirements, regulatory requirements, operational requirements, general other policies within an organization, etc., but the disclosure is not limited thereto. According to exemplary embodiments, the SSRM 306 may be configured to be storage platform agnostic—configured to be deployed across multiple storage layers with both structured and unstructured data.

According to exemplary embodiments, the SSRM 306 may be configured to receive continuous feed of data from the datastore(s) 312 and the server 304 via the communication network 310 in real time.

According to exemplary embodiments, the datastore(s) 312 may also be a public, private, or hybrid cloud-based datastore(s) or combination therein that supports user authentication, datastore security, and integration with existing datastores and developments as well as stores with open API specification definition file (i.e., in JSON format) corresponding to an application, but the disclosure is not limited thereto.

According to exemplary embodiments, the SSRM 406 may be implemented via user interfaces, e.g., web user interface, a build automation tool used primarily for Java projects, private Jenkins, etc., but the disclosure is not limited thereto, and may be integrated with a public, private, or hybrid cloud platform and a distributed file system platform via the SSRM 406 and an authentication service, but the disclosure is not limited thereto.

As will be described below, the SSRM 306 may be configured to establish a communication link between a plurality of data sources (i.e., datastore(s) 312) and an event bus; implement a machine learning model configured to receive a plurality of real-time telemetry data and historical event data associated with an application or a suite of applications supporting an infrastructure or a business process from the plurality of data sources via the event bus; automatically predict, by utilizing the machine learning model, a probability data of an availability incident based on the received plurality of real-time telemetry data and the historical event data; determine, based on the probability data, associated risk and impact of an amount of data loss that could occur in an event of a destructive attack that would cause a need to rebuild and/or restore the application or the suite of applications supporting the business process; and dynamically provide an estimate data on overall recovery time and/or rebuild time of the application or the suite of applications based on determining the associated risk and impact of the amount of data loss, but the disclosure is not limited thereto.

The plurality of client devices 308(1)-308(n) are illustrated as being in communication with the SSRD 302. In this regard, the plurality of client devices 308(1)-308(n) may be "clients" of the SSRD 302 and are described herein as such. Nevertheless, it is to be known and understood that the plurality of client devices 308(1)-308(n) need not necessarily be "clients" of the SSRD 302, or any entity described in association therewith herein. Any additional or alternative relationship may exist between either or more of the plurality of client devices 308(1)-308(n) and the SSRD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the SSRD 302 via broadband or cellular communication. Of course, these embodiments are merely exemplary and are not limiting or exhaustive.

Figure 4:
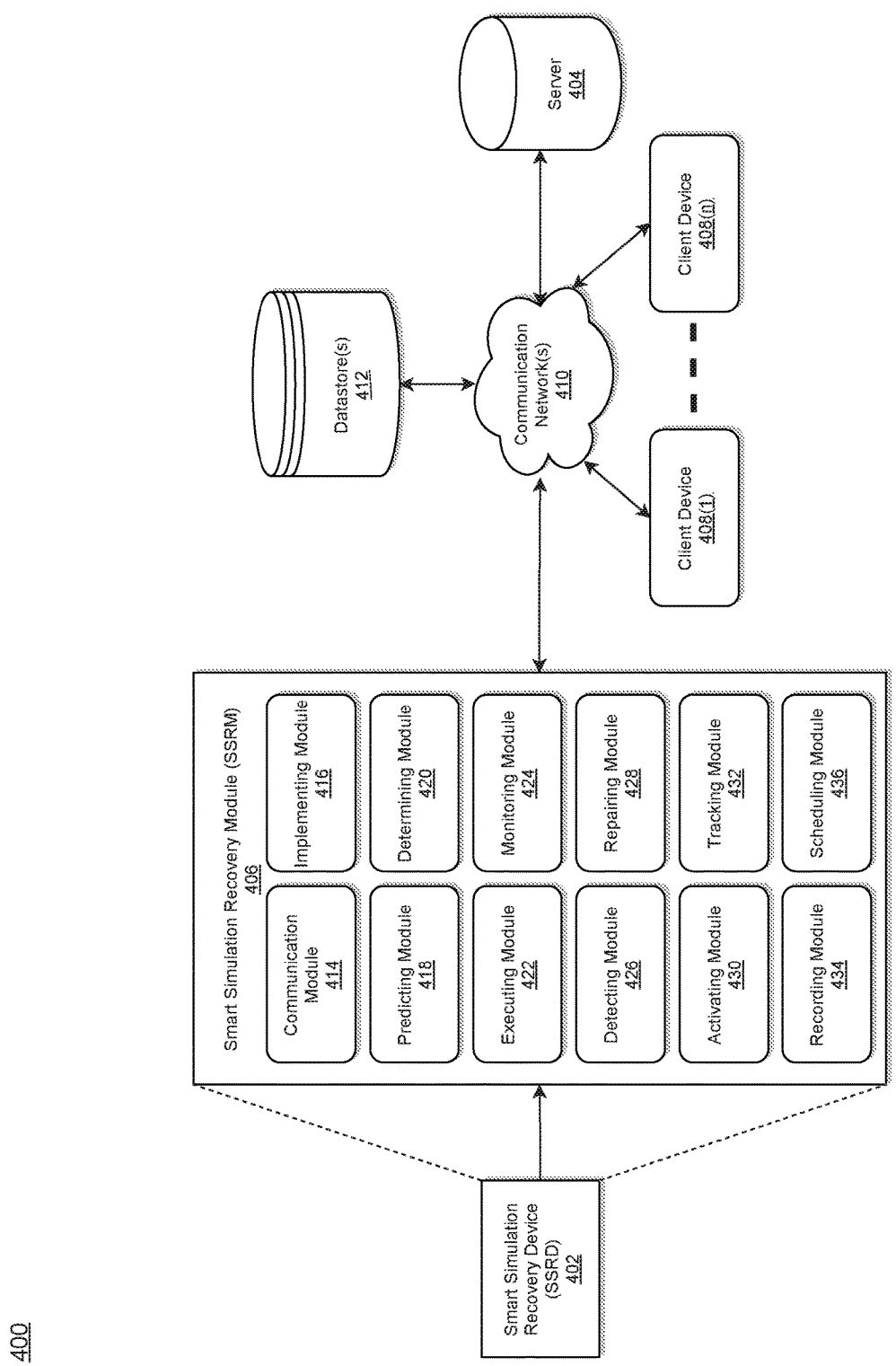
FIG. 4 illustrates a system diagram of the key components for implementing a smart simulation recovery module of FIG. 3 in accordance with an exemplary embodiment.

FIG. 4 illustrates a system diagram for implementing a smart simulation recovery module of FIG. 3 in accordance with an exemplary embodiment.

As illustrated in FIG. 4, the system 400 may include an SSRD 402 within which a smart simulation recovery module (SSRM) 406 may be embedded, a datastore(s) (i.e., a plurality of data sources) 412, a server 404, client devices 408(1)-408(n), and a communication network 410. According to exemplary embodiments, the SSRD 402, the SSRM 406, the datastore(s) 412, the server 404, the client devices 408(1)-408(n), and the communication network 410 as illustrated in FIG. 4 may be the same or similar to the SSRD 302, the SSRM 306, the datastores) 312, the server 304, the client devices 308(1)-308(n), and the communication network 310, respectively, as illustrated in FIG. 3.

As illustrated in FIG. 4, the SSRM 406 may include a communication module 414, an implementing module 416, a predicting module 418, a determining module 420, an executing module 422, a monitoring module 424, a detecting module 426, a repairing module 428, an activating module 430, a tracking module 432, a recording module 434, and a scheduling module 436. According to exemplary embodiments, the datastore(s) 412 may be external to the SSRD 402 may include various systems that are managed and operated by an organization. Alternatively, according to exemplary embodiments, the datastore(s) 412 may be embedded within the SSRD 402 and/or the SSRM 406.

The process may be executed via the communication module 414 and the communication network 410, which may comprise plural networks as described above. For example, in an exemplary embodiment, the various components of the SSRM 406 may communicate with the server 404, and the datastore(s) 412 via the communication module 414 and the communication network 410. Of course, these embodiments are merely exemplary and are not limiting or exhaustive.

According to exemplary embodiments, the communication network 410 and the communication module 414 may be configured to establish a link between the datastore(s) 412, the client devices 408(1)-408(n) and the SSRM 406.

According to exemplary embodiments, each of the communication module 414, implementing module 416, predicting module 418, determining module 420, executing module 422, monitoring module 424, detecting module 426, repairing module 428, activating module 430, tracking module 432, recording module 434, and the scheduling module 436 may be implemented by microprocessors or similar, they may be programmed using software (e.g., microcode) to perform various functions discussed herein and may optionally be driven by firmware and/or software. Alternatively, each of the communication module 414, implementing module 416, predicting module 418, determining module 420, executing module 422, monitoring module 424, detecting module 426, repairing module 428, activating module 430, tracking module 432, recording module 434, and the scheduling module 436 may be implemented by dedicated hardware, or as a combination of dedicated hardware to perform some functions and a processor (e.g., one or more programmed microprocessors and associated circuitry) to perform other functions. Also, according to exemplary embodiments, each of the communication module 414, implementing module 416, predicting module 418, determining module 420, executing module 422, monitoring module 424, detecting module 426, repairing module 428, activating module 430, tracking module 432, recording module 434, and the scheduling module 436 may be physically separated into two or more interacting and discrete blocks, units, devices, and/or modules without departing from the scope of the inventive concepts.

According to exemplary embodiments, each of the communication module 414, implementing module 416, predicting module 418, determining module 420, executing module 422, monitoring module 424, detecting module 426, repairing module 428, activating module 430, tracking module 432, recording module 434, and the scheduling module 436 of the SSRM 406 may be called by corresponding API, but the disclosure is not limited thereto.

Figure 5:
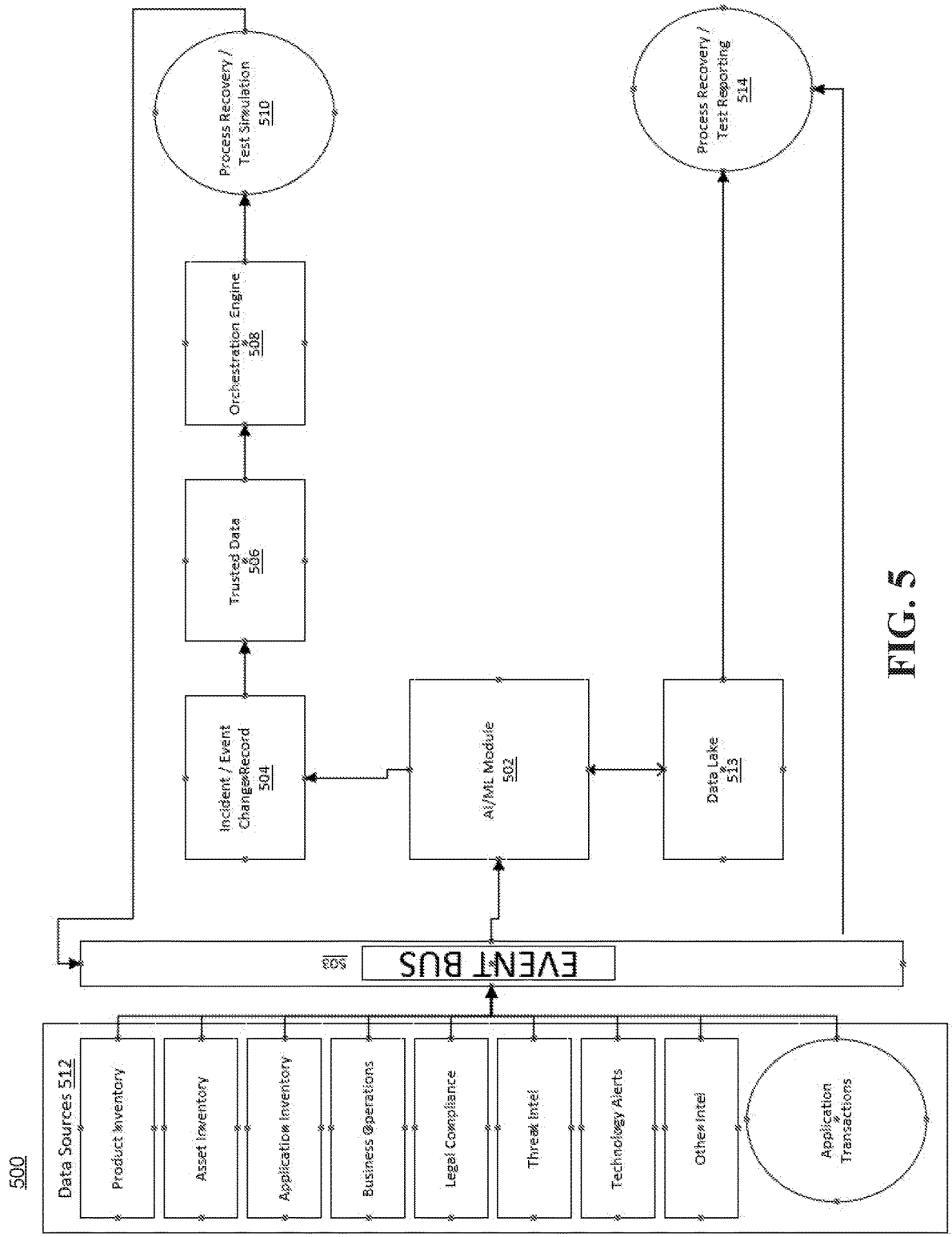
FIG. 5 illustrates an exemplary architecture diagram of automatic predictive analysis of information technology (IT) process recovery via real-time telemetry implemented by the smart simulation recovery module of FIG. 4 in accordance with an exemplary embodiment.

FIG. 5 illustrates an exemplary architecture diagram of automatic predictive analysis of business process recovery via real-time telemetry implemented by the SSRM 406 of FIG. 4 in accordance with an exemplary embodiment.

As illustrated in FIG. 5, the exemplary architecture diagram 500 may include a plurality of data sources 512 connected to an event bus 503, an artificial intelligence (AI)/machine learning (ML) module 502 connected to the event bus 503. Data can flow from the data sources 512 to the event bus 503. Data from the event bus 503 can flow to the AI/ML 502. Data from the AI/ML 502 can flow to an incident/event change record 504 and then to trusted data 506 and then to an orchestration engine 508 which triggers a process recovery/test simulation process 510. Results data from the process recovery/test simulation process is feedback to the event bus 503 for consumption by the AI/ML module 502.

According to exemplary embodiments, data can flow in a bidirectional way between the AI/ML module 502 and a data lake 513. Data from the data lake 513 and data from the event bus 503 may be utilized by the SSRM 406 to trigger a process recovery/test reporting process 514.

According to exemplary embodiments, the AI/ML module 502 may be configured to: receive application data, asset data, data recovery data, business process data, technology product data, application transaction data and threat intelligence data from corresponding data sources 512 to calculate recovery capabilities/metrics for critical business processes and services. The SSRM 406 may monitor critical business processes and services to identify potential operational risk, where expected recovery times are incongruent with actual recovery times by regulation, business objectives, technology design or sub-optimal operational processes.

According to exemplary embodiments, when a potential availability incident is detected, the AI/ML module 502 may be further configured to identify the business process or service and calculate the potential operational risk to a firm as a whole or an organizational unit and activate the orchestration engine 508 to position for recovery.

According to exemplary embodiments, the SSRM 406 may include an asset inventory module that may be configured to dynamically track information assets within an organization, but the disclosure is not limited thereto.

According to exemplary embodiments, the SSRM 406 may include an application inventory module that may be configured to dynamically track application within an organization, but the disclosure is not limited thereto.

According to exemplary embodiments, the SSRM 406 may include a product catalog module that may be configured to dynamically track resiliency and recovery attributes of technology products that will be used in an organization, but the disclosure is not limited thereto.

According to exemplary embodiments, the SSRM 406 may include a configuration and orchestration engine 508 that may be configured to perform automated repair and/or change functions. This configuration and orchestration engine 508 may also additionally activate full autonomous recovery of impacted environment, but the disclosure is not limited thereto.

According to exemplary embodiments, the SSRM 406 may include a change record module that may be configured to record pending IT-related changes and impacted assets and timeframes for implementation and human-generated risk and impact assessments, but the disclosure is not limited thereto.

According to exemplary embodiments, the SSRM 406 may include a business operations module that may be configured to identify business processes, services and products and their criticality to an organization's business operations, but the disclosure is not limited thereto.

According to exemplary embodiments, the SSRM 406 may include a threat intelligence module that may be configured to identify threats the organization faces, has, will, or are currently targeting the organization, but the disclosure is not limited thereto. This information may be utilized to prepare, prevent, and identify threats looking to take advantage of valuable resources.

According to exemplary embodiments, the SSRM 406 may include a legal and compliance module that may be configured to identity regulatory bodies and regulations for business and/or application data, but the disclosure is not limited thereto.

The event bus 503 may be configured to provide one or more communication channels between technology assets, application transactions and threat intelligence to analyze, prepare and execute recovery activities in real-time.

According to exemplary embodiments, the SSRM 406 may include a data lake module that may be configured to provide a centralized location (i.e., data lake 513) of historical recovery incident data as input for recovery predictive analysis. This data lake 513 may map application inventory with business operations module to determine upstream/downstream impact for availability and enrich decision making. According to exemplary embodiments, the data lake 513 may store the metrics from recovery events to provide the AI/ML processes real time recovery data to enrich AI/ML automated decision making in the recovery process as well as to reinforce learning and understanding of the outages and the recovery processes.

According to exemplary embodiments, the SSRM 406 may include a trusted data module that may be configured to obtain data from trusted data stores to recover application(s), but the disclosure is not limited thereto.

The process recovery/test reporting process 514 is the recovery processes to rebuild/recovery to last known good (trusted state) or provide simulation (testing) of recovery process.

Referring to FIGS. 4 and 5, the communication module 414 may be configured to establish a communication link between the plurality of data sources 512 and the event bus 503. The implementing module 416 may be configured to implement a machine learning model generated by the AI/ML module 502. The machine learning model may be configured to receive a plurality of real-time telemetry data and historical event data associated with an application or a suite of applications supporting an infrastructure or a business process from the plurality of data sources 512 via the event bus 503.

According to exemplary embodiments, the predicting module 418 may be configured to automatically predict, by utilizing the machine learning model, a probability data of an availability incident based on the received plurality of real-time telemetry data and the historical event data.

According to exemplary embodiments, the determining module 420 may be configured to determine, based on the probability data, associated risk and impact of an amount of data loss that could occur in an event of a destructive attack that would cause a need to rebuild and/or restore the application or the suite of applications supporting the infrastructure or the business process.

According to exemplary embodiments, the executing module 422 may be configured to dynamically provide an estimate data on overall recovery time and/or rebuild time of the application or the suite of applications based on determining the associated risk and impact of the amount of data loss.

According to exemplary embodiments, the plurality of real-time telemetry data may include application data, asset data, data recovery data, business process data, technology product data, application transaction data and threat intelligence data etc. to calculate recovery capabilities and/or metrics for critical infrastructure or business processes and services, but the disclosure is not limited thereto.

According to exemplary embodiments, the monitoring module 424 may be configured to monitor the critical infrastructure or a business processes and services to identify potential operational risk, wherein expected recovery times are incongruent with actual recovery times by regulation, business objectives, technology design, or sub-optimal operational processes.

According to exemplary embodiments, the detecting module 426 may be configured to automatically detect, by utilizing the machine learning model, the availability incident based on the received plurality of real-time telemetry data and the historical event data. The executing module 422 may be configured to perform automated repair and/or change functions based on the estimate data in response to the event of the destructive attack.

According to exemplary embodiments, the activating module 430 may be configured to activate a full autonomous recovery process of impacted environment in response to the event of the destructive attack.

According to exemplary embodiments, the event bus 503 may be configured to provide one or more communication channels between technology asset data source, application transaction data source, and threat intelligence data source to analyze and execute recovery activities in real-time.

According to exemplary embodiments, in receiving the plurality of real-time telemetry data, the tracking module 432 may be configured to dynamically track information assets data within an organization; dynamically track the application or the suite of applications within the organization; and dynamically track resiliency and recovery attributes data of technology products that are used in the organization.

According to exemplary embodiments, in determining the associated risk and the impact of the amount of data loss, the recording module 434 may be configured to record pending IT-related changes and impacted assets and timeframes for implementation and human-generated risk and impact assessments.

According to exemplary embodiments, the machine learning module 502 may be configured to alert and determine capacity requirements and/or availability of alternate infrastructure impacted to begin orchestrating recovery and the overall recovery time and the amount of data loss, based on several factors such as but not limited to the time of day, the time month and other operational criteria.

According to exemplary embodiments, the executing module 422 may be configured to automatically provide simulations result for recovery; and the scheduling module 436 may be configured to automatically schedule a recovery test to validate the simulations result.

According to exemplary embodiments, when a potential availability incident is detected, the machine learning module 502 may be further configured to identify a business process or a service and calculate a potential operational risk to an organization as a whole or an organizational unit and activate an orchestration engine to execute recovery. According to exemplary embodiments, the system and method disclosed herein may also be capable of analyzing potential changes in regulatory environment, where an organization may be required to divest itself or a portion of a business unit or process (i.e. break up the bank) to identify impacted technology and/or business groups.

Figure 6:
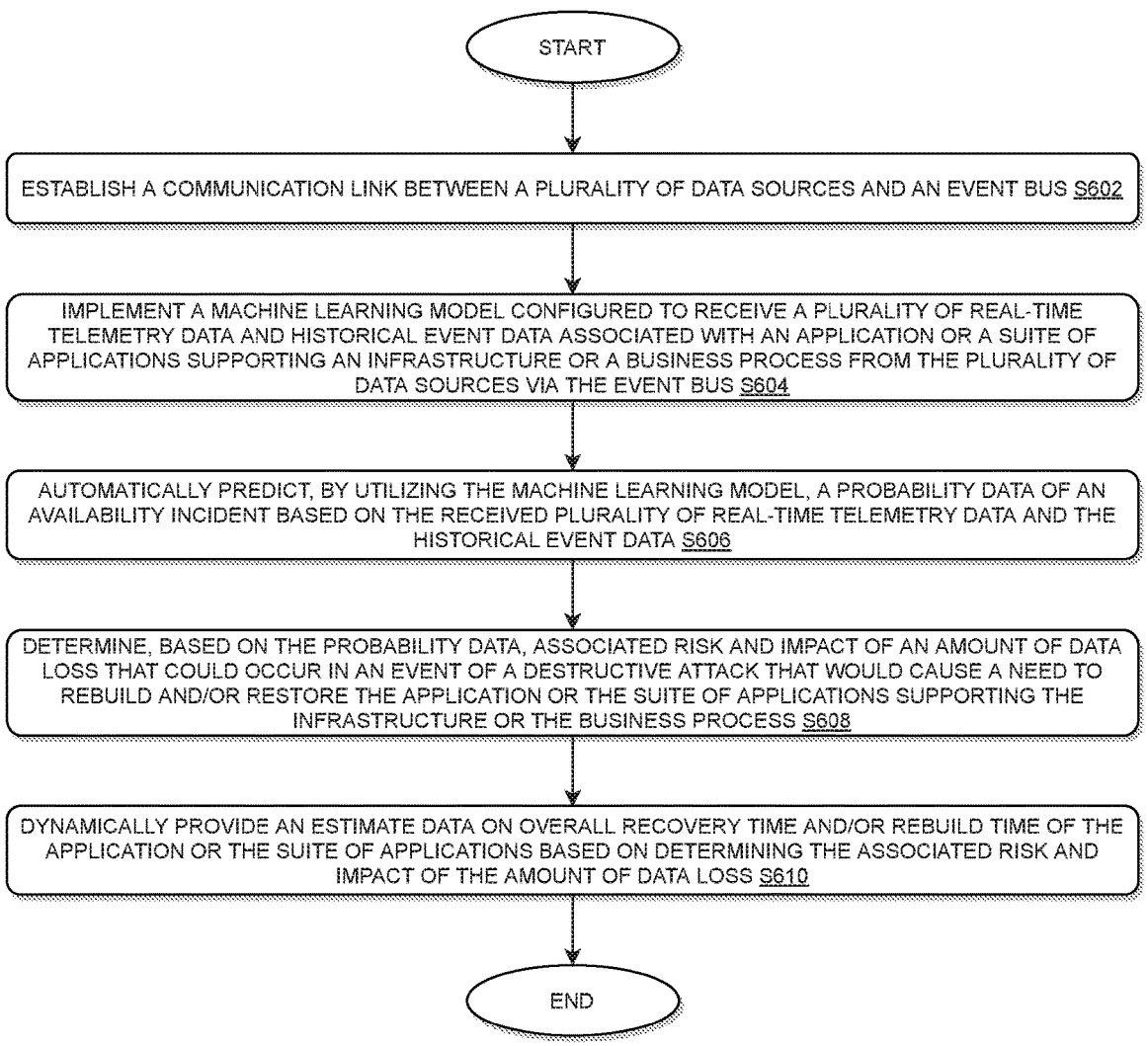
FIG. 6 illustrates an end to end flow diagram for implementing a smart simulation recovery module in accordance with an exemplary embodiment.

FIG. 6 illustrates a flow diagram for implementing a smart simulation recovery module in accordance with an exemplary embodiment.

At step S602, the process 600 may include: establishing a communication link between a plurality of data sources and an event bus.

At step S604, the process 600 may include: implementing a machine learning model configured to receive a plurality of real-time telemetry data and historical event data associated with an application or a suite of applications supporting a business process from the plurality of data sources via the event bus.

At step S606, the process 600 may include: automatically predicting, by utilizing the machine learning model, a probability data of an availability incident based on the received plurality of real-time telemetry data and the historical event data;

At step S608, the process 600 may include: determining, based on the probability data, associated risk and impact of an amount of data loss that could occur in an event of a destructive attack that would cause a need to rebuild and/or restore the application or the suite of applications supporting the infrastructure or the business process.

At step S610, the process 600 may include: dynamically providing an estimate data on overall recovery time and/or rebuild time of the application or the suite of applications based on determining the associated risk and impact of the amount of data loss.

According to exemplary embodiments, the process 600 may further include: monitoring the critical infrastructure or the business processes and services to identify potential operational risk, wherein expected recovery times are incongruent with actual recovery times by regulation, business objectives, technology design, or sub-optimal operational processes.

According to exemplary embodiments, the process 600 may further include: automatically detecting, by utilizing the machine learning model, the availability incident based on the received plurality of real-time telemetry data and the historical event data; and performing automated repair and/or change functions based on the estimate data in response to the event of the destructive attack.

According to exemplary embodiments, the process 600 may further include: activating a full autonomous recovery process of impacted environment in response to the event of the destructive attack.

According to exemplary embodiments, in receiving the plurality of real-time telemetry data, the process 600 may further include: dynamically tracking information assets data within an organization; dynamically tracking the application or the suite of applications within the organization;

and dynamically tracking resiliency and recovery attributes data of technology products that are used in the organization.

According to exemplary embodiments, in determining the associated risk and the impact of the amount of data loss, the process 600 may further include: recording pending business-related changes and impacted assets and timeframes for implementation and human-generated risk and impact assessments.

According to exemplary embodiments, the process 600 may further include: automatically providing simulations result for recovery; and automatically scheduling a recovery test to validate the simulations result.

According to exemplary embodiments, when a potential availability incident is detected, the process 600 may further include causing the machine learning model to identify a business process or a service and calculate a potential operational risk to an organization as a whole or an organizational unit and activate an orchestration engine to execute recovery.

According to exemplary embodiments, the process 600 may further include: providing a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

According to exemplary embodiments, the process 600 may further include: executing one or more of the following processes: a recovery process to rebuild the application or the suite of applications; a recovery process to last known good (trusted state) of the application or the suite of applications, and a simulation/testing of a recovery process.

According to exemplary embodiments, the SSRD 402 may include a memory (e.g., a memory 106 as illustrated in FIG. 1) which may be a non-transitory computer readable medium that may be configured to store instructions for implementing the SSRM 406 that automatically provide predictive analysis of business process recovery via real-time telemetry to a trusted state as disclosed herein. The SSRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SSRM 406 or within the SSRD 402, may be used to perform one or more of the methods and processes as described herein. In a particular embodiment, the instructions may reside completely, or at least partially, within the memory 106, the medium reader 112, and/or the processor 104 (see FIG. 1) during execution by the SSRD 402.

For example, the instructions, when executed, may cause the processor 104 to perform the following: establishing a communication link between a plurality of data sources and an event bus; implementing a machine learning model configured to receive a plurality of real-time telemetry data and historical event data associated with an application or a suite of applications supporting an infrastructure or a business process from the plurality of data sources via the event bus; automatically predicting, by utilizing the machine learning model, a probability data of an availability incident based on the received plurality of real-time telemetry data and the historical event data; determining, based on the probability data, associated risk and impact of an amount of data loss that could occur in an event of a destructive attack that would cause a need to rebuild and/or restore the application or the suite of applications supporting the infrastructure or the business process; and dynamically providing estimate data on overall recovery time and/or rebuild time of the application or the suite of applications based on determining the associated risk and impact of the amount of data loss, but the disclosure is not limited thereto.

According to exemplary embodiments, the instructions, when executed, may cause the processor 104 to perform the following: monitoring the critical infrastructure or the business processes and services to identify potential operational risk, wherein expected recovery times are incongruent with actual recovery times by regulation, business objectives, technology design, or sub-optimal operational processes.

According to exemplary embodiments, the instructions, when executed, may cause the processor 104 to perform the following: automatically detecting, by utilizing the machine learning model, the availability incident based on the received plurality of real-time telemetry data and the historical event data; and performing automated repair and/or change functions based on the estimate data in response to the event of the destructive attack.

According to exemplary embodiments, the instructions, when executed, may cause the processor 104 to perform the following: activating a full autonomous recovery process of impacted environment in response to the event of the destructive attack.

According to exemplary embodiments, in receiving the plurality of real-time telemetry data, the instructions, when executed, may cause the processor 104 to perform the following: dynamically tracking information assets data within an organization; dynamically tracking the application or the suite of applications within the organization; and dynamically tracking resiliency and recovery attributes data of technology products that are used in the organization.

According to exemplary embodiments, in determining the associated risk and the impact of the amount of data loss, the instructions, when executed, may cause the processor 104 to perform the following: recording pending IT-related changes and impacted assets and timeframes for implementation and human-generated risk and impact assessments.

According to exemplary embodiments, the instructions, when executed, may cause the processor 104 to perform the following: automatically providing simulations result for recovery; and automatically scheduling a recovery test to validate the simulations result.

According to exemplary embodiments, when a potential availability incident is detected, the instructions, when executed, may cause the processor 104 to perform the following: causing the machine learning model to identify a business process or a service and calculate a potential operational risk to an organization as a whole or an organizational unit and activate an orchestration engine to execute recovery.

According to exemplary embodiments, the instructions, when executed, may cause the processor 104 to perform the following: providing a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

According to exemplary embodiments, the instructions, when executed, may cause the processor 104 to perform the following: executing one or more of the following processes: a recovery process to rebuild the application or the suite of applications; a recovery process to last known good (trusted state) of the application or the suite of applications, and a simulation/testing of a recovery process.

According to exemplary embodiments as disclosed above in FIGS. 1-6, technical improvements effected by the instant disclosure may include platforms for implementing a smart simulation recovery module that automatically provides estimate on overall recovery time of an application or an infrastructure or a business process as well as the amount of data loss that could occur in the event of a destructive malware attack that would cause the need to rebuild and restore the application or a suite of applications supporting a business process that includes IT, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed datastore/datacenter, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatic predictive analysis of a recovery time of an application or an infrastructure via real-time telemetry to a trusted state, by utilizing one or more processors and one or more memories, the method comprising:

implementing a smart simulation recovery module (SSRM) that automatically provides an estimate on overall recovery time of an application or an infrastructure as well as an amount of data loss that could occur in an event of a destructive malware attack that would cause a need to rebuild and restore the application or a suite of applications that includes information technology, wherein the SSRM includes a communication module, an implementing module, a predicting module, a determining module, a detecting module, and an executing module, wherein each module being called via corresponding application programming interface (API);

establishing, by calling the communication module via a first application programming interface (API), a communication link between a plurality of data sources and an event bus;

implementing, by calling the implementing module via a second API, a machine learning model configured to receive a plurality of real-time telemetry data and historical event data associated with the application or the suite of applications supporting the infrastructure from the plurality of data sources via the event bus;

automatically predicting, by calling the predicting module via a third API, by utilizing the machine learning model, a probability data of an availability incident based on the received plurality of real-time telemetry data and the historical event data;

automatically detecting, by utilizing the machine learning model, the availability incident based on the received plurality of real-time telemetry data and the historical event data by calling the detecting module via a corresponding API;

determining, by calling the determining module via a fourth API, based on the probability data, associated risk and impact of an amount of data loss that could occur in an event of a destructive attack that would cause a need to rebuild and/or restore the application or the suite of applications supporting the infrastructure;

dynamically providing an estimate, by calling the executing module via a fifth API, data on overall recovery time and/or rebuild time of the application or the suite of applications based on determining the associated risk and impact of the amount of data loss;

detecting, by calling the detecting module, the event of the destructive attack; and performing automated repair and/or change functions to rebuild and/or restore the application or the suite of applications supporting the infrastructure based on the estimate data in response to the detection of the event of the destructive attack.

2. The method according to claim 1, wherein the plurality of real-time telemetry data includes application data, asset data, data recovery data, business process data, technology product data, application transaction data and threat intelligence data to calculate recovery capabilities and/or metrics for critical infrastructure or business processes and services.

3. The method according to claim 2, further comprising: monitoring the critical infrastructure or the business processes and services to identify potential operational risk, wherein expected recovery times are incongruent with actual recovery times by regulation, business objectives, technology design, or sub-optimal operational processes.

4. The method according to claim 1, further comprising: activating a full autonomous recovery process of impacted environment in response to the event of the destructive attack.

5. The method according to claim 1, wherein the event bus is configured to provide one or more communication channels between technology asset data source, application transaction data source, and threat intelligence data source to analyze and execute recovery activities in real-time.

6. The method according to claim 1, wherein, in receiving the plurality of real-time telemetry data, the method further comprising:

dynamically tracking information assets data within an organization;

dynamically tracking the application or the suite of applications within the organization; and dynamically tracking resiliency and recovery attributes data of technology products that are used in the organization.

7. The method according to claim 1, wherein, in determining the associated risk and the impact of the amount of data loss, the method further comprising:

recording pending infrastructure or business-related changes and impacted assets and timeframes for implementation and human-generated risk and impact assessments.

8. The method according to claim 1, wherein the machine learning model is configured to alert and determine capacity requirements and/or availability of alternate infrastructure impacted to begin orchestrating recovery and the overall recovery time and the amount of data loss.

9. The method according to claim 1, further comprising: automatically providing simulations result for recovery; and automatically scheduling a recovery test to validate the simulations result.

10. The method according to claim 1, wherein, when a potential availability incident is detected, the machine learning model is further configured to identify a business process or a service and calculate a potential operational risk to an organization as a whole or an organizational unit and activate an orchestration engine to execute recovery.

11. The method according to claim 1, further comprising: providing a centralized repository of historical recovery incident data as input for the probability data utilized for recovery predictive analysis, wherein the centralized repository maps application inventory with a business operations module to determine upstream and/or downstream impact for availability and enrich decision making, and wherein the business operations module is configured to identify business processes, services and products and their criticality to an organization's business operations.

12. The method according to claim 1, further comprising: executing one or more of the following processes: a recovery process to rebuild the application or the suite of applications; a recovery process to last known trusted state of the application or the suite of applications, and a simulation/testing of a recovery process.

13. A system for automatic predictive analysis of a recovery time of an application or an infrastructure via real-time telemetry to a trusted state, the system comprising:

a processor; and a memory operatively connected to the processor via a communication interface, the memory storing computer readable instructions, when executed, causes the processor to:

implement a smart simulation recovery module (SSRM) that automatically provides an estimate on overall recovery time of an application or an infrastructure as well as an amount of data loss that could occur in an event of a destructive malware attack that would cause a need to rebuild and restore the application or a suite of applications that includes information technology, wherein the SSRM includes a communication module, an implementing module, a predicting module, a determining module, a detecting module, and an executing module, wherein each module being called via corresponding application programming interface (API);

establish, by calling the communication module via a first API, a communication link between a plurality of data sources and an event bus;

implement, by calling the implementing module via a second API, a machine learning model configured to receive a plurality of real-time telemetry data and historical event data associated with the application or the suite of applications supporting the infrastructure from the plurality of data sources via the event bus;

automatically predict, by calling the predicting module via a third API, by utilizing the machine learning model, a probability data of an availability incident based on the received plurality of real-time telemetry data and the historical event data;

automatically detect, by utilizing the machine learning model, the availability incident based on the received plurality of real-time telemetry data and the historical event data by calling the detecting module via a corresponding API;

determine, by calling the determining module via a fourth API, based on the probability data, associated risk and impact of an amount of data loss that could occur in an event of a destructive attack that would cause a need to rebuild and/or restore the application or the suite of applications supporting the infrastructure;

dynamically provide an estimate, by calling the executing module via a fifth API, data on overall recovery time and/or rebuild time of the application or the suite of applications based on determining the associated risk and impact of the amount of data loss;

detect, by calling the detecting module, the event of the destructive attack; and perform automated repair and/or change functions to rebuild and/or restore the application or the suite of applications supporting the infrastructure based on the estimate data in response to the detection of the event of the destructive attack.

14. The system according to claim 13, wherein the plurality of real-time telemetry data includes application data, asset data, data recovery data, business process data, technology product data, application transaction data and threat intelligence data to calculate recovery capabilities and/or metrics for critical infrastructure or business processes and services.

15. The system according to claim 14, wherein the processor is further configured to:

monitor the critical infrastructure or the business processes and services to identify potential operational risk, wherein expected recovery times are incongruent with actual recovery times by regulation, business objectives, technology design, or sub-optimal operational processes.

16. The system according to claim 13, wherein the processor is further configured to:

activate a full autonomous recovery process of impacted environment in response to the event of the destructive attack.

17. The system according to claim 16, wherein the event bus is configured to provide one or more communication channels between technology asset data source, application transaction data source, and threat intelligence data source to analyze and execute recovery activities in real-time.

18. A non-transitory computer readable medium configured to store instructions for automatic predictive analysis of a recovery time of an application or an infrastructure via real-time telemetry to a trusted state, wherein, when executed, the instructions cause a processor to perform the following:

implementing a smart simulation recovery module (SSRM) that automatically provides an estimate on overall recovery time of an application or an infrastructure as well as an amount of data loss that could occur in an event of a destructive malware attack that would cause a need to rebuild and restore the application or a suite of applications that includes information technology, wherein the SSRM includes a communication module, an implementing module, a predicting module, a determining module, a detecting module, and an executing module, wherein each module being called via corresponding application programming interface (API);

establishing, by calling the communication module via a first application programming interface (API), a communication link between a plurality of data sources and an event bus;

implementing, by calling the implementing module via a second API, a machine learning model configured to receive a plurality of real-time telemetry data and historical event data associated with the application or the suite of applications supporting the infrastructure from the plurality of data sources via the event bus;

automatically predicting, by calling the predicting module via a third API, by utilizing the machine learning model, a probability data of an availability incident based on the received plurality of real-time telemetry data and the historical event data;

automatically detecting, by utilizing the machine learning model, the availability incident based on the received plurality of real-time telemetry data and the historical event data by calling the detecting module via a corresponding API;

determining, by calling the determining module via a fourth API, based on the probability data, associated risk and impact of an amount of data loss that could occur in an event of a destructive attack that would cause a need to rebuild and/or restore the application or the suite of applications supporting the infrastructure;

dynamically providing an estimate, by calling the executing module via a fifth API, data on overall recovery time and/or rebuild time of the application or the suite of applications based on determining the associated risk and impact of the amount of data loss;

detecting, by calling the detecting module, the event of the destructive attack; and performing automated repair and/or change functions to rebuild and/or restore the application or the suite of applications supporting the infrastructure based on the estimate data in response to the detection of the event of the destructive attack.

19. The non-transitory computer readable medium according to claim 18, wherein the instructions, when executed, cause the processor to further perform the following:
   activating a full autonomous recovery process of impacted environment in response to the event of the destructive attack.

20. The non-transitory computer readable medium according to claim 18, wherein the event bus is configured to provide one or more communication channels between technology asset data source, application transaction data source, and threat intelligence data source to analyze and execute recovery activities in real-time.

* * * * *